United States Patent
Miyazawa

(10) Patent No.: US 10,535,989 B2
(45) Date of Patent: Jan. 14, 2020

(54) SEMICONDUCTOR APPARATUS

(71) Applicant: FUJI ELECTRIC CO., LTD., Kanagawa (JP)

(72) Inventor: Shigemi Miyazawa, Matsumoto (JP)

(73) Assignee: FUJI ELECTRIC CO., LTD., Kanagawa (JP)

( * ) Notice: Subject to any disclaimer, the term of this patent is extended or adjusted under 35 U.S.C. 154(b) by 303 days.

(21) Appl. No.: 15/633,787

(22) Filed: Jun. 27, 2017

(65) Prior Publication Data
US 2018/0048139 A1   Feb. 15, 2018

(30) Foreign Application Priority Data

Aug. 12, 2016   (JP) .................................. 2016-158608

(51) Int. Cl.
| | |
|---|---|
| *H02H 3/08* | (2006.01) |
| *H02H 1/00* | (2006.01) |
| *F02P 3/04* | (2006.01) |
| *F02P 11/06* | (2006.01) |

(52) U.S. Cl.
CPC ............ *H02H 3/08* (2013.01); *H02H 1/0007* (2013.01); *F02P 3/0435* (2013.01); *F02P 11/06* (2013.01)

(58) Field of Classification Search
CPC ............................. H02H 3/08; H02H 1/0007
USPC ........................................................ 361/93.1
See application file for complete search history.

(56) References Cited

U.S. PATENT DOCUMENTS

| | | | | |
|---|---|---|---|---|
| 6,385,028 | B1* | 5/2002 | Kouno | ................ H01L 27/0629 |
| | | | | 257/E27.016 |
| 2004/0200463 | A1 | 10/2004 | Ando | |
| 2012/0033341 | A1* | 2/2012 | Miyazawa | .............. F23Q 3/004 |
| | | | | 361/253 |
| 2012/0215431 | A1 | 8/2012 | Miyazawa | |
| 2015/0042397 | A1* | 2/2015 | Mathieu | ............. H03K 17/0828 |
| | | | | 327/381 |

FOREIGN PATENT DOCUMENTS

| | | |
|---|---|---|
| JP | H09-280147 A | 10/1997 |
| JP | 2000-310173 A | 11/2000 |
| JP | 2004-316469 A | 11/2004 |
| JP | 2008-248777 A | 10/2008 |
| JP | 2012-172572 A | 9/2012 |

* cited by examiner

*Primary Examiner* — Thienvu V Tran
*Assistant Examiner* — Lucy M Thomas

(57) ABSTRACT

A semiconductor apparatus is provided, comprising: a power semiconductor element which is connected between a first terminal on a high-potential side and a second terminal on a low-potential side; a first gate control section which controls a gate potential of the power semiconductor element according to a control signal; a discharge circuit which is discharges charges that are charged by the gate of the power semiconductor element; a second gate control section which controls the gate potential of the power semiconductor element according to a collector current of the power semiconductor element; a feedback section which feedbacks the charges to the gate of the power semiconductor element according to the collector potential of the power semiconductor element; and a current cutting off section which cuts off currents flowing from the first terminal to the gate of the power semiconductor element according to the control signal.

12 Claims, 10 Drawing Sheets

SEMICONDUCTOR APPARATUS

The contents of the following Japanese patent application(s) are incorporated herein by reference:
NO. 2016-158608 filed on Aug. 12, 2016.

BACKGROUND

1. Technical Field

The present invention relates to a semiconductor apparatus.

2. Related Art

Conventionally, a power semiconductor device dealing with large power has been known as a semiconductor apparatus used for an ignition of an internal combustion engine and the like. It has been known that a circuit to drive such a power semiconductor device comprises a current limit circuit which detects currents of the power semiconductor device to protect an ignition coil or fuse and the like from an overcurrent (for example, refer to Patent Document 1). Also, it has been known that the power semiconductor device comprises a self-cutting off circuit which detects an abnormal state such as overheating and the like to protect the internal combustion engine from the influence (for example, refer to Patent Document 2).

[Patent Document 1] Japanese Patent Application Publication No. 2000-310173
[Patent Document 2] Japanese Patent Application Publication No. 2008-248777

However, if the driving circuit of the power semiconductor device is equipped with a combination of such current limit circuit and self-cutting off circuit, a minute current from the current limit circuit to the gate and a gate discharge current from the self-cutting off circuit may be balanced. In this case, since the driving circuit causes the power semiconductor device to operate in a state where the self-cutting off remains incomplete, the power semiconductor device cannot be switched to an OFF state and the currents would continue flowing sometimes. Therefore, a semiconductor apparatus for ignition which can accurately execute the overcurrent protection and the self-cutting off functions has been desired.

SUMMARY

Here, a purpose in one aspect of the technology innovation included in the present specification is to provide a semiconductor apparatus which can solve the above-described problem. This purpose can be achieved by combinations of the features according to the claims. That is, in a first aspect of the present invention, a semiconductor apparatus is provided, comprising a power semiconductor element which is connected between a first terminal on a high-potential side and a second terminal on a low-potential side and is controlled to be turned on or off according to a gate potential, a first gate control section which controls the gate potential of the power semiconductor element according to a control signal that is input from a control terminal and controls the power semiconductor element, a discharge circuit which is connected between the gate of the power semiconductor element and a reference potential and discharges charges that are charged by the gate of the power semiconductor element, a second gate control section which controls the gate potential of the power semiconductor element according to a collector current of the power semiconductor element, a feedback section which feedbacks the charges to the gate of the power semiconductor element according to a collector potential of the power semiconductor element, and a current cutting off section which cuts off currents flowing from the first terminal to the gate of the power semiconductor element according to the control signal.

The summary clause of the invention described above does not necessarily describe all necessary features of the embodiments of the present invention. The present invention may also be a sub-combination of the features described above.

DESCRIPTION OF EXEMPLARY EMBODIMENTS

Hereinafter, the embodiments do not limit the invention according to the claims, and all the combinations of the features described in the embodiments are not necessarily essential to means provided by aspects of the invention.

Figure 1:
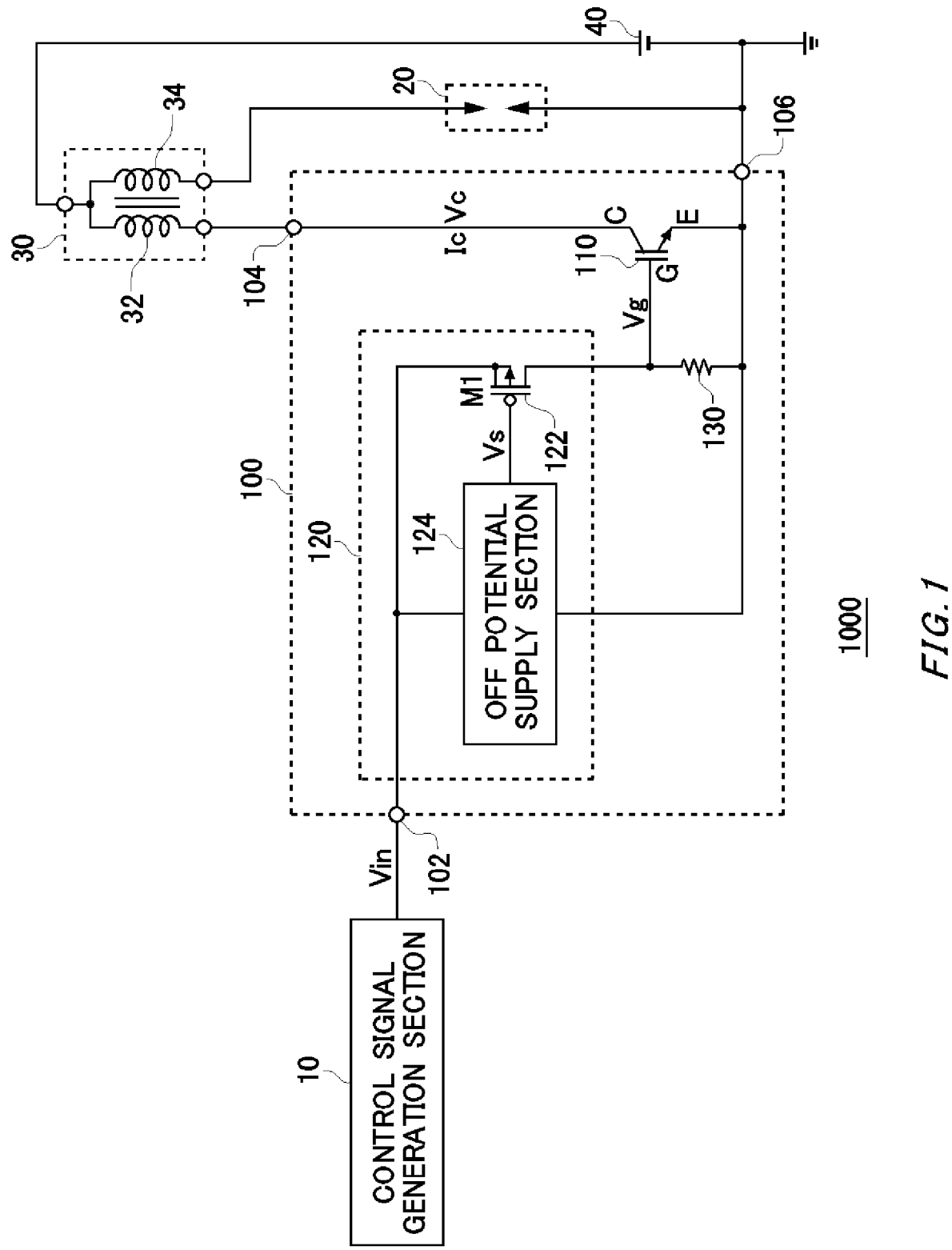
FIG. 1 shows an exemplary configuration of an ignition apparatus 1000 according to the present embodiment.

FIG. 1 shows an exemplary configuration of an ignition apparatus 1000 according to the present embodiment. The ignition apparatus 1000 ignites an ignition plug used for an internal combustion engine and the like of automobiles and the like. In the present embodiment, an example where the ignition apparatus 1000 is equipped in an engine of an automobile will be described. The ignition apparatus 1000 comprises a control signal generation section 10, an ignition plug 20, an ignition coil 30, a power source 40, and a semiconductor apparatus 100.

The control signal generation section 10 generates a switching control signal (hereinafter, abbreviated to control signal) which controls switching between on and off of the semiconductor apparatus 100. For example, the control signal generation section 10 is a part or the whole of an engine control unit (ECU) of an automobile where the ignition apparatus 1000 is equipped. The control signal generation section 10 supplies the generated control signal to the semiconductor apparatus 100. As a result of the control signal generation section 10 supplying the semiconductor apparatus 100 with the control signal, the ignition apparatus 1000 starts an igniting operation of the ignition plug 20.

The ignition plug 20 electrically generates sparks by discharges. For example, the ignition plug 20 discharges by an applied voltage which is equal to or greater than about 10 kV. As one example, the ignition plug 20 is provided in an internal combustion engine, and in this case, ignites combustible gas such as mixed gas and the like in the combustion chamber. The ignition plug 20 is, for example, provided in a through hole which penetrates from outside the cylinder to the combustion chamber inside the cylinder, and is fixed so as to seal the through hole. In this case, one end of the ignition plug 20 is exposed inside the combustion chamber and the other end receives an electrical signal from the outside of the cylinder.

An ignition coil 30 supplies the electrical signal to the ignition plug 20. The ignition coil 30 supplies a high voltage as the electrical signal to cause the ignition plug 20 to discharge. The ignition coil 30 may function as a transformer and is an ignition coil having a primary coil 32 and a secondary coil 34, for example. One end of the primary coil 32 and one end of the secondary coil 34 are electrically connected. The primary coil 32 has a smaller number of turns of winding than the secondary coil 34 and shares a core with the secondary coil 34. The secondary coil 34 generates an electromotive force (a mutual induced electromotive force) according to an electromotive force generated in the primary coil 32. The secondary coil 34 is connected to the ignition plug 20 on the other end and supplies the generated electromotive force to the ignition plug 20 to cause the ignition plug 20 to discharge.

A power source 40 supplies a voltage to the ignition coil 30. For example, the power source 40 supplies a predetermined constant voltage Vb (14V, as one example) to one end of the primary coil 32 and one end of the secondary coil 34. The power source 40 is a battery of automobiles as one example.

The semiconductor apparatus 100 switches between conduction (on) and non-conduction (off) between the other end of the primary coil 32 of the ignition coil 30 and a reference potential according to a control signal supplied from the control signal generation section 10. For example, the semiconductor apparatus 100 switches to conduction between the primary coil 32 and the reference potential in response to the control signal having a high potential (an ON potential), and switching to non-conduction between the primary coil 32 and the reference potential in response to the control signal having a low potential (an OFF potential).

Here, the reference potential may be a reference potential in a control system of an automobile, or may be a reference potential corresponding to the semiconductor apparatus 100 inside an automobile. The reference potential may be the low potential to turn the semiconductor apparatus 100 off, and is 0V, as one example. The semiconductor apparatus 100 comprises a control terminal 102, a first terminal 104, a second terminal 106, a power semiconductor element 110, a first gate control section 120, and a discharge circuit 130.

The control terminal 102 inputs a control signal which controls the power semiconductor element 110. The control terminal 102 is connected to the control signal generation section 10 and receives the control signal. The first terminal 104 is connected to the power source 40 via the ignition coil 30. The second terminal 106 is connected to the reference potential. That is, the first terminal 104 is a terminal on a high-potential side compared to the second terminal 106, and the second terminal 106 is a terminal on a low-potential side compared to the first terminal 104.

The power semiconductor element 110 includes a gate terminal (G), a collector terminal (C), and an emitter terminal (E), and electrically connects or disconnects between the collector terminal and the emitter terminal according to the control signal input to the gate terminal. The power semiconductor element 110 is connected between the first terminal 104 on the high-potential side and the second terminal 106 on the low-potential side, and is controlled to be turned on or off according to a gate potential. The power semiconductor element 110 is an insulated gate bipolar transistor (IGBT), as one example.

The power semiconductor element 110 has a withstand voltage up to several hundreds of V, as one example. For example, the power semiconductor element 110 is a vertical device in which a collector electrode is formed on a first surface side of a substrate and a gate electrode and an emitter electrode are formed on a second surface side which is opposite to the first surface. Also, the power semiconductor element 110 may be a vertical MOSFET. As one example, the emitter terminal of the power semiconductor element 110 is connected to the reference potential. Also, the collector terminal is connected to the other end of the primary coil 32. In the present exemplary embodiment, an example is described, where the power semiconductor element 110 is an n channel type IGBT which electrically connects between the collector terminal and the emitter terminal in response to the control signal becoming the ON potential.

The first gate control section 120 controls the gate potential of the power semiconductor element 110 according to the control signal which is input from the control terminal 102 and controls the power semiconductor element 110. That is, the first gate control section 120 supplies, according to the control signal, to the gate of the power semiconductor element 110 the potential which causes the power semiconductor element 110 to be turned on or off. The first gate control section 120 uses the electrical signal which is input from the control terminal 102 as a power source, for example. The first gate control section 120 has a first switch element 122 and an OFF potential supply section 124.

The first switch element 122 is connected between the control terminal 102 and the gate of the power semiconductor element 110, and is controlled to be turned on or off according to the input potential. The first switch element 122 is, as one example, an FET which is controlled to be turned on or off between a drain terminal and a source terminal according to the gate potential. In the first switch element 122, the drain terminal is connected to the control terminal 102 and the source terminal is connected to a gate terminal of a power semiconductor element 110 to switch whether or not to supply the control signal input from the control terminal 102 to the gate terminal of the power semiconductor element 110.

The first switch element 122 is, as one example, a normally-on switch element which electrically disconnects between the drain terminal and the source terminal in response to the gate terminal having the ON potential (the high potential). In this case, it is desired that the first switch element 122 is a p channel type MOSFET.

The OFF potential supply section 124 supplies an OFF potential which turns the first switch element 122 off to the gate of the first switch element 122 in response to the control signal satisfying a predetermined cut-off condition. The OFF potential supply section 124 is connected to a detection apparatus and the like detecting an abnormal electric conduction, an abnormal overheating, and the like of the power semiconductor element 110, and determines that the cut-off condition is satisfied in response to the abnormality of the power semiconductor element 110 being detected.

That is, the OFF potential supply section 124 cuts off the control signal supply from the control terminal 102 to the power semiconductor element 110 in response to the abnormality of the power semiconductor element 110 being detected. The OFF potential supply section 124 may generate the cut-off signal which is to be the high potential from the low potential. In this way, the power semiconductor element 110 is switched to the OFF state. The OFF potential supply section 124 will be described later.

The discharge circuit 130 is connected between the gate of the power semiconductor element 110 and the reference potential, and discharges charges which are charged by a capacity component of the gate of the power semiconductor element 110. The discharge circuit 130 discharges the charges of the gate terminal and switches the power semiconductor element 110 to the OFF state if the control signal supply from the control terminal 102 to the power semiconductor element 110 is cut off.

The discharge circuit 130 is connected to the gate terminal of the power semiconductor element 110 on one end and connected to the reference potential on the other end. The discharge circuit 130 may discharge the charges at a predetermined time constant. That is, once the control signal supply to the power semiconductor element 110 is cut off, the discharge circuit 130 switches the power semiconductor element 110 to the OFF state after the predetermined period of time elapses. FIG. 1 shows an example where the discharge circuit 130 is a resistance element. The discharge circuit 130 may have a capacity component and/or an inductance component and the like.

The semiconductor apparatus 100 according to the present embodiment described above causes the ignition plug 20 to discharge to ignite the combustible gas if the power semiconductor element 110 is in a normal state. Also, the semiconductor apparatus 100 relaxes/cuts off the power semiconductor element 110 if the abnormality of the power semiconductor element 110 is detected. Operations of such a semiconductor apparatus 100 will be described in the followings.

Figure 2:
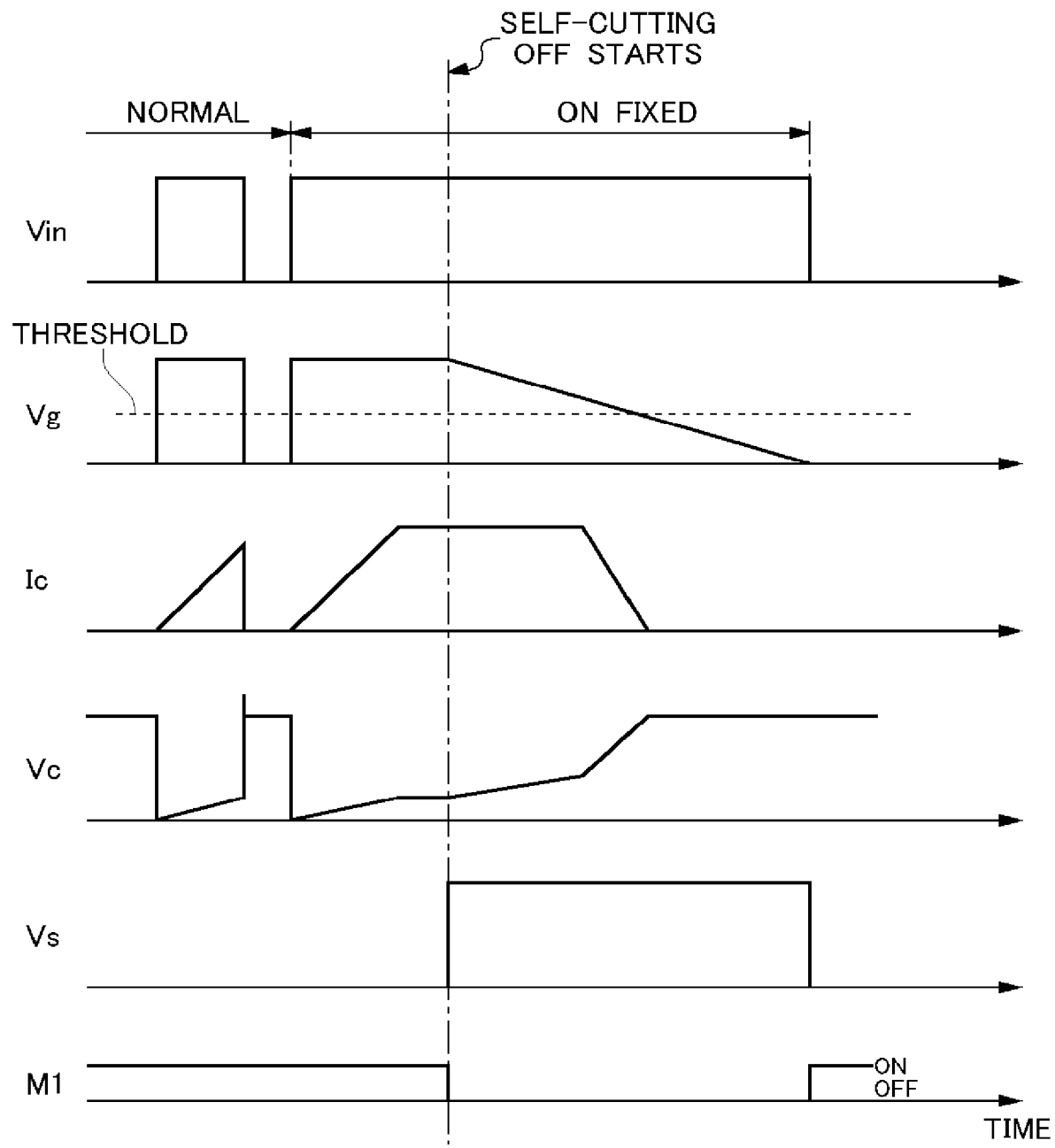
FIG. 2 shows one example of operation waveforms of each section of a semiconductor apparatus 100 according to the present embodiment.

FIG. 2 shows one example of operation waveforms of each section of the semiconductor apparatus 100 according to the present embodiment. In FIG. 2, the horizontal axis indicates time and the vertical axis indicates potentials or current values. Also, in FIG. 2, Vin indicates a control signal input from the control terminal 102, Vg indicates a gate potential of the power semiconductor element 110, Ic indicates currents (referred to as collector currents) between the collector and the emitter of the power semiconductor element 110, Vc indicates potentials (referred to as collector potentials) between the collector and the emitter of the power semiconductor element 110, Vs indicates output potentials (cut-off signals) of the OFF potential supply section 124, and M1 indicates ON and OFF states of the first switch element 122.

In a normal state where no abnormality is detected in the power semiconductor element 110, if the control signal Vin is the low potential, the cut-off signal Vs is the low potential (as one example, 0V), and the first switch element 122 (M1) becomes to be in the ON state. Accordingly, the low potential of the control signal Vin becomes the gate potential Vg of the power semiconductor element 110, the collector current Ic becomes approximate 0 A, and the collector potential Vc becomes the output potential of the power source.

Then, as the control signal Vin becomes the high potential, the high potential becomes the gate potential Vg of the power semiconductor element 110 and the state is switched to the ON state, the collector current Ic starts to increase, and the collector potential Vc becomes approximate 0V and then starts to increase. That is, the collector current Ic flows from the power source 40 via the primary coil 32 of the ignition coil 30. It should be noted that a time change dIc/dt of the collector current Ic is determined according to an inductance of the primary coil 32 and a supply voltage of the power source 40, increasing to a predetermined (or set) current value. For example, the collector current Ic increases to about several A, dozen of A, or about several dozens of A.

Then, as the control signal Vin becomes the low potential again, the low potential then becomes the gate potential Vg of the power semiconductor element 110, the power semiconductor element 110 switches to the OFF state and the collector current Ic drastically decreases. Due to the drastic decrease of the collector current Ic, a both-end voltage of the primary coil 32 drastically increases by the self-induction electromotive force, and generates the induced electromotive force up to about several dozens of kV in a both-end voltage of the secondary coil 34. The ignition apparatus 1000 causes the ignition plug 20 to discharge to ignite the combustible gas by supplying the voltage of such a secondary coil 34 to the ignition plug 20.

As the igniting operation of such an ignition apparatus 1000 is executed, the collector current Ic returns to the approximate 0 A and the collector potential Vc returns to the output potential of the power source. Note that, as the igniting operation, the collector potential Vc instantaneously becomes the high potential and then returns to the output potential of the power source. The above is the operations of the semiconductor apparatus 100 in a range shown as "normal" in the control signal Vin of FIG. 2.

Next, an example is described, where a failure and the like occur in the control signal generation section 10 and the control signal Vin remains the high potential without switching to the low potential. In this case, until the state where the control signal Vin becomes the high potential, as described above, the gate potential Vg is the high potential, the collector current Ic starts to increase, and the collector potential Vc becomes the approximate 0V and then starts to increase.

Here, as the control signal Vin is kept at the high potential, the gate potential Vg also maintains the high potential, and the collector current Ic increases to a current value (as one example, 17 A) determined from an element constant and the like and saturates, and accordingly, the collector potential Vc also saturates. That is, since the saturated current continues flowing in the power semiconductor element 110, the temperature of the power semiconductor element 110 and/or the ambient temperature of the power semiconductor element 110 are raised and become to be in the abnormal state. As such an abnormal state is detected, the OFF potential supply section 124 starts the self-cut off of the semiconductor apparatus 100. FIG. 2 shows, as one example, a starting time of the self-cut off by dashed line.

The OFF potential supply section 124 supplies the cut-off signal Vs being the OFF potential to the gate of the first switch element 122 to cause the first switch element 122 to be in the OFF state. Accordingly, the power semiconductor element 110 is switched to the OFF state; however, by the discharge circuit 130, the gate potential Vg of the power semiconductor element 110 gradually transfers to the low potential, compared to the switching to the low potential in the normal operation. Accordingly, after the gate potential Vg becomes equal to or less than the threshold, the collector current Ic starts to decrease and then returns to 0 A finally. FIG. 2 shows an example of the threshold of the gate potential Vg by dotted line.

Therefore, the collector potential Vc is gradually raised to a degree to which the igniting operation does not start, and the raised speed increases in response to the gate potential Vg becoming equal to or less than the threshold, and, after that, returns to the potential in the initial state finally. After the collector current Ic and the collector potential Vc return to the original states, the gate potential Vg returns to the low potential. It should be noted that as the state of the control signal generation section 10 returns to the original one and the control signal becomes the low potential, the cut-off signal Vs of the OFF potential supply section 124 also becomes the low potential and switches the first switch element 122 to the ON state. The above is the operations of the semiconductor apparatus 100 in a range shown as "ON fixed" in the control signal Vin of FIG. 2.

As described above, if the abnormality of the power semiconductor element 110 is detected, the semiconductor apparatus 100 according to the present embodiment temporally gradually lowers the gate potential of the power semiconductor element 110 to a degree to which the discharge of the ignition plug due to the drastic fluctuation of the collector current Ic can be prevented. Accordingly, the semiconductor apparatus 100 can relax/cut off the power semiconductor element 110 while preventing an erroneous discharge of the ignition plug 20 according to the abnormality of the power semiconductor element 110.

Figure 3:
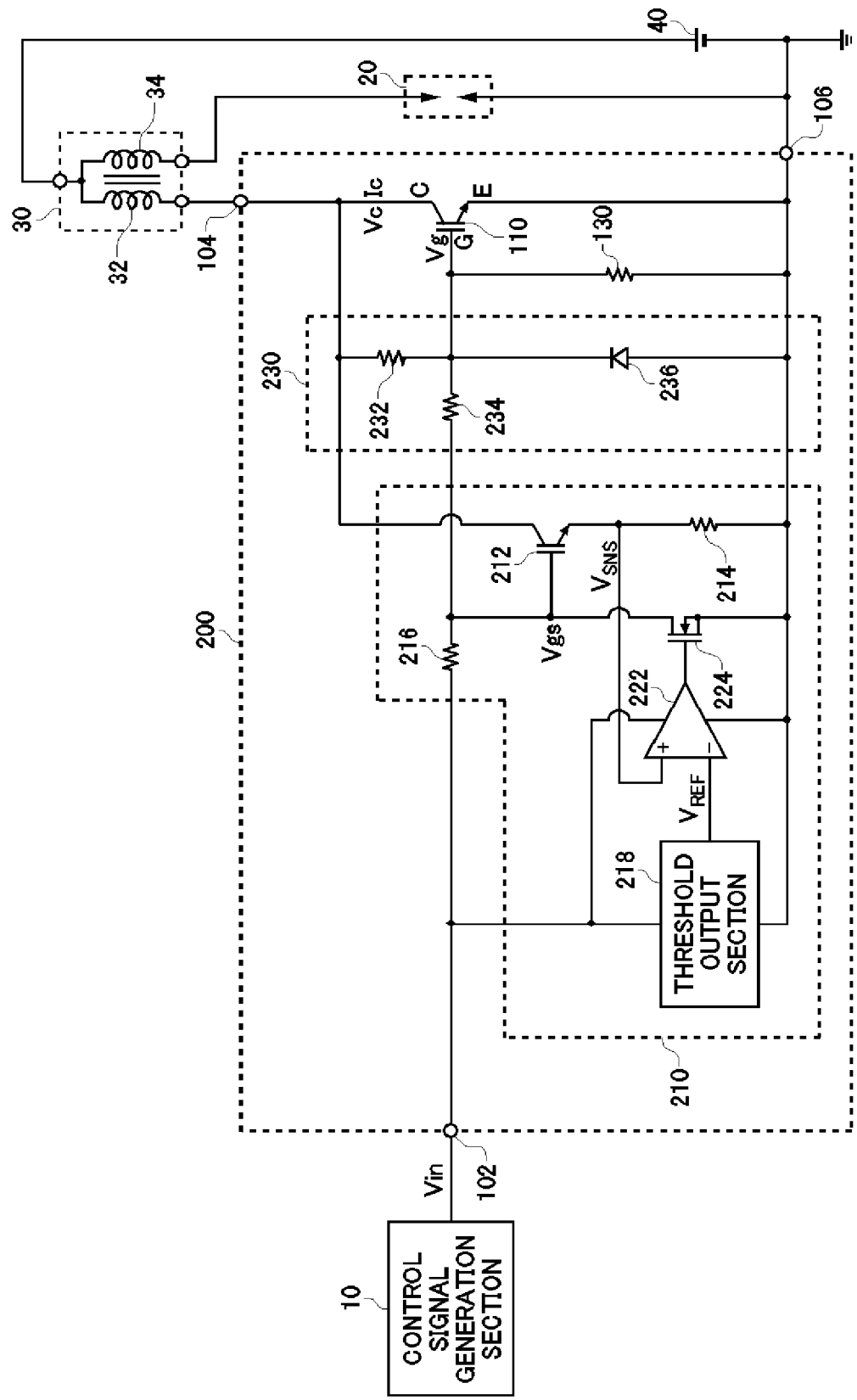
FIG. 3 shows an exemplary configuration of an ignition apparatus 2000 according to the present embodiment.

FIG. 3 shows an exemplary configuration of an ignition apparatus 2000 according to the present embodiment. In the ignition apparatus 2000 shown in FIG. 2, the operations approximately the same as those of the ignition apparatus 1000 according to the present embodiment shown in FIG. 1 are respectively provided with the same reference signs as the ignition apparatus 1000, and the descriptions are omitted. The ignition apparatus 2000 comprises a semiconductor apparatus 200. The descriptions for the control signal generation section 10, the ignition plug 20, the ignition coil 30, and the power source 40 which are comprised in the ignition apparatus 2000 are omitted.

The semiconductor apparatus 200 limits the collector current Ic flowing through the power semiconductor element 110 to be equal to or less than the approximately constant current to prevent the erroneous discharge of the ignition plug 20. The semiconductor apparatus 200 comprises a second gate control section 210 and a feedback section 230. The descriptions for the control terminal 102, the first terminal 104, the second terminal 106, and the power semiconductor element 110 which are comprised in the semiconductor apparatus 200 are omitted.

The second gate control section 210 is provided between the control terminal 102 and the power semiconductor element 110, and controls the gate potential of the power semiconductor element according to the collector current Ic of the power semiconductor element 110. That is, the second gate control section 210 adjusts the gate potential of the power semiconductor element 110 according to the magnitude of the collector current Ic to stabilize the collector current Ic. For example, the second gate control section 210 uses the electrical signal input from the control terminal 102 as the power source. The second gate control section 210 has a second switch element 212, a detection section 214, a resistance 216, a threshold output section 218, a comparing section 222, and a third switch element 224.

The second switch element 212 is connected between the first terminal 104 and the second terminal 106 and is controlled to be turned on or off according to the input potential. Similar to the power semiconductor element 110, the second switch element 212 electrically connects or disconnects between the first terminal 104 and the second terminal 106 according to the input potential input to the gate. For example, the second switch element 212 is a power semiconductor element having approximately the same threshold and a smaller transconductance, compared to the power semiconductor element 110. The transconductance of the second switch element 212 is, as one example, one-thousandth of the power semiconductor element 110.

The second switch element 212 is, as one example, an insulated gate bipolar transistor (IGBT). It is desired that the second switch element 212 is formed of a material and by a process approximately similar to those of the power semiconductor element 110. In the second switch element 212, for example, the emitter terminal is connected to the reference potential, and the collector terminal is connected to the other end of the primary coil 32. In the present exemplary embodiment, an example is described, where the second switch element 212 is an n channel type IGBT which electrically connects between the collector terminal and the emitter terminal in response to the input potential becoming the ON potential (the high potential). That is, the second switch element 212 is used as a sense IGBT which operates similar to the power semiconductor element 110 and senses the operations of the power semiconductor element 110 according to the control signal.

The detection section 214 is connected between the second switch element 212 and the second terminal 106 and detects the amount of currents flowing from the first terminal 104 to the second terminal 106. For example, the detection section 214 outputs, as the detection result, the detection potential $V_{SNS}$ in accordance with the detected amount of currents. The detection section 214 includes, for example, a resistance which is connected to the emitter terminal of the second switch element 212 on one end and connected to the reference potential on the other end. In this case, the detection section 214 generates, between the one end and the other end, a potential difference in accordance with the currents flowing from the first terminal 104 to the second terminal 106 via the second switch element 212.

The resistance 216 is provided between the control terminal 102 and the power semiconductor element 110. Also, the resistance 216 is provided between the control terminal 102 and the second switch element 212. The resistance 216 is, for example, connected to the control terminal 102 on one end and connected to the gate terminal of the second switch element 212 on the other end. That is, similar to the power semiconductor element 110, the control signal input from the control terminal 102 is supplied to the gate terminal of the second switch element 212.

The threshold output section 218 outputs a predetermined threshold potential $V_{REF}$. For example, the threshold output section 218 outputs the threshold potential in accordance with a tolerance value of the amount of currents flowing through the detection section 214. The threshold output section 218 may be configured with combinations of a constant current circuit, a resistance, and the like, or may be configured with combinations and the like of a Zener diode, a resistance, and the like.

The comparing section 222 compares a detection result of the detection section 214 to the predetermined threshold potential $V_{REF}$ output by the threshold output section 218. For example, the comparing section 222 outputs the high potential as the comparison result in response to a detection potential $V_{SNS}$ output by the detection section 214 exceeding the threshold potential $V_{REF}$, and outputs the low potential as the comparison result if the detection potential $V_{SNS}$ is equal to or less than the threshold potential $V_{REF}$. The comparing section 222 has a comparator and the like, for example.

The third switch element 224 is connected between the gate of the second switch element 212 and the second terminal 106, and controls the gate potential of the second switch element 212 according to the comparison result of the comparing section 222. For example, the third switch element 224 decreases the electrical resistance between a drain terminal connected to the gate of the second switch element 212 and a source terminal connected to the second terminal 106 in response to the comparison result of the comparing section 222 becoming the high potential. That is, the third switch element 224 adjusts the gate potential Vgs of the second switch element 212 so that the detection potential $V_{SNS}$ is kept at the threshold $V_{REF}$ if the detection potential $V_{SNS}$ of the detection section 214 exceeds the threshold $V_{REF}$.

On the other hand, the third switch element 224 disconnects the electrical connection between the gate of the second switch element 212 and the second terminal 106 if the comparison result of the comparing section 222 is the low potential. Therefore, the potential in accordance with the control signal input from the control terminal 102 is to be supplied to the gate of the second switch element 212 and the gate of the power semiconductor element 110 via the resistance 216. The third switch element 224 is a normally-off switch element as one example and it is desired that the third switch element 224 is an n channel type MOSFET.

The feedback section 230 feedbacks the charges to the gate of the power semiconductor element 110 according to the collector potential of the power semiconductor element 110. The feedback section 230 is provided between the second gate control section 210 and the power semiconductor element 110 and supplies the charges to the gate of the power semiconductor element 110 according to the control operation of the second gate control section 210. The feedback section 230 has a first resistance 232, a second resistance 234, and a rectifying element 236.

The first resistance 232 is provided between the first terminal 104 and the gate of the power semiconductor element 110. Also, the second resistance 234 is connected between the gate of the power semiconductor element 110 and the second gate control section 210. Also, the rectifying element 236 is connected between the gate of the power semiconductor element 110 and the second terminal 106. That is, the first resistance 232 is connected between the first terminal 104 and the rectifying element 236.

As one example, one end of the first resistance 232 is connected to the first terminal 104, and the other end is respectively connected to the gate of the power semiconductor element 110, one end of the second resistance 234, one end of the rectifying element 236, and one end of the discharge circuit 130. In this case, the other end of the second resistance 234 is respectively connected to the other end of the resistance 216 of the second gate control section 210, the gate terminal of the second switch element 212, and the drain terminal of the third switch element 224. Also, the other end of the rectifying element 236 is connected to the second terminal 106.

The above-described feedback section 230 increases the gate potential of the power semiconductor element 110 if the collector potential of the power semiconductor element 110 is larger than the gate potential, to relax and stabilize the increase of the collector potential of the power semiconductor element 110. Also, the feedback section 230 sets the potential, which is in accordance with the currents flowing through the first resistance 232 and the second resistance 234, as the gate potential of the power semiconductor element 110 in response to the collector current of the power semiconductor element 110 becoming excessive. Operations of such a semiconductor apparatus 200 will be described in the followings.

Figure 4:
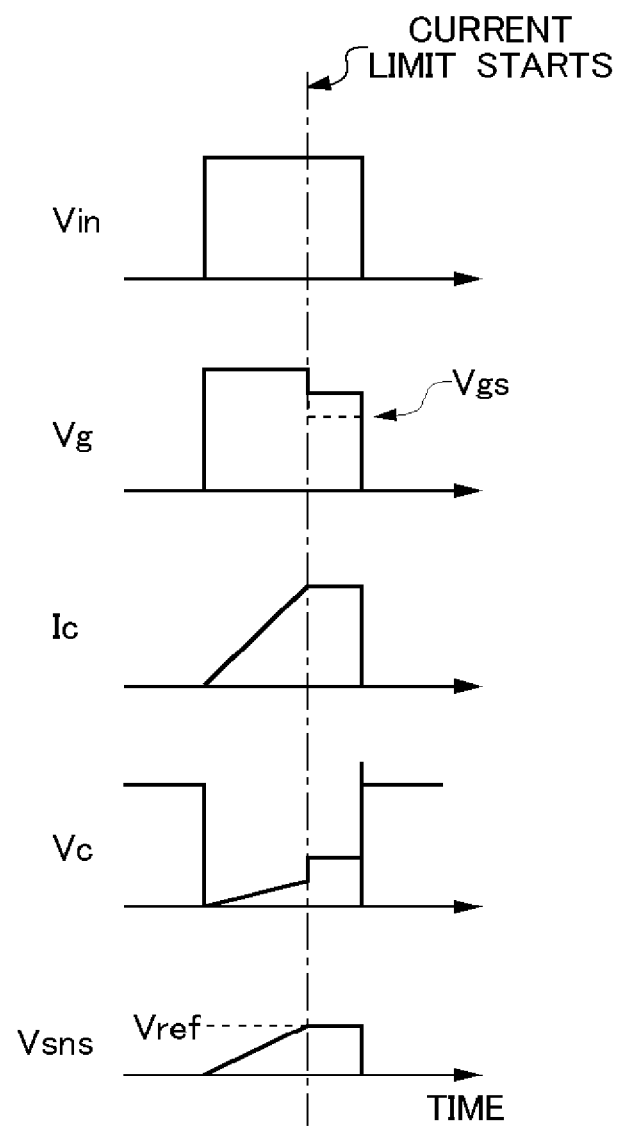
FIG. 4 shows one example of operation waveforms of each section of a semiconductor apparatus 200 according to the present embodiment.

FIG. 4 shows one example of operation waveform of each section of the semiconductor apparatus 200 according to the present embodiment. In FIG. 4, the horizontal axis indicates time and the vertical axis indicates potentials or current values. Also, in FIG. 4, Vin indicates the control signal input from the control terminal 102, Vg indicates the gate potential of the power semiconductor element 110, Ic indicates the collector current of the power semiconductor element 110, Vc indicates the collector potential of the power semiconductor element 110, and $V_{SNS}$ indicates the detected potential of the detection section 214.

In the normal state of the power semiconductor element 110, if the control signal Vin is the low potential, the low potential of the control signal Vin becomes the gate potential Vg of the power semiconductor element 110, the collector current Ic becomes the approximate 0 A, and the collector potential Vc becomes the output potential of the power source. Then, as the control signal Vin becomes the high potential, the high potential becomes the gate potential Vg of the power semiconductor element 110 and switches to the ON state, the collector current Ic starts to increase, and the collector potential Vc becomes the approximate 0V and then starts to increase.

That is, as described in FIG. 1 and FIG. 2, the collector current Ic flows from the power source 40 via the primary coil 32 of the ignition coil 30. It should be noted that a time change dIc/dt of the collector current Ic is determined in accordance with the inductance of the primary coil 32 and the supply voltage of the power source 40, and the collector current Ic increases according to the time change dIc/dt. For example, the collector current Ic increases to about several A, dozen of A, or several dozens of A.

Here, as the increase of the collector current Ic continues, the temperature of the power semiconductor element 110 and/or the ambient temperature of the power semiconductor element 110 are raised and become to be in the abnormal state. Also, the collector current Ic exceeding a rated current of the component and the like connected to the power semiconductor element 110 may be also generated to result in the failure, breakdown, and the like of these components in some cases. Here, the second gate control section 210 stops the increase of the collector current Ic if such a collector current Ic exceeds the threshold. That is, the second gate control section 210 starts the current limit of the collector current Ic in response to the detection potential $V_{SNS}$ of the detection section 214 exceeding the reference potential $V_{REF}$. FIG. 4 shows the starting time of the current limit by dashed line, as one example.

The comparing section 222 outputs the high potential in response to the detection potential $V_{SNS}$ exceeding the threshold potential $V_{REF}$, and the third switch element 224 decreases the electrical resistance between the gate of the second switch element 212 and the second terminal 106. That is, the currents flow between the drain and the source of the third switch element 224, and a voltage drop occurs. Accordingly, the voltage of the control signal Vin is divided by an ON resistance of the resistance 216 and the third switch element 224, and the drain potential of the voltage-divided third switch element 224 becomes the gate potential Vgs of the second switch element 212.

As the above, the gate potential Vgs of the second switch element 212 becomes a potential lower than the high potential of the control signal Vin. Also, since the currents flows from the first terminal 104 to the second terminal 106 via the first resistance 232, the second resistance 234, and the third switch element 224, a potential difference is generated on two ends of the second resistance 234. That is, the gate potential Vg of the power semiconductor element 110 is lower than the high potential of the control signal Vin and becomes a higher potential than the gate potential Vgs of the second switch element 212, and the increase of the collector current Ic is limited.

Then, since the third switch element 224 adjusts the gate potential Vgs of the second switch element 212 so that the detection potential $V_{SNS}$ of the detection section 214 is kept at the threshold $V_{REF}$, the collector current Ic and the collector potential Vc can be kept in the approximately constant values. In this way, since the second gate control section 210 adjusts the gate potential Vg of the power semiconductor element 110 so that the collector current Ic is kept constant, the feedback section 230 supplies the charges to the gate of the power semiconductor element 110 corresponding to the adjustment of the gate potential Vg. That is, the feedback section 230 refluxes a minute current to the gate of the power semiconductor element 110 to keep the collector current Ic constant.

Then, as the control signal Vin then becomes the low potential again, the low potential becomes the gate potential Vg of the power semiconductor element 110, the power semiconductor element 110 switches to the OFF state, and the collector current Ic drastically decreases. Due to the drastic decrease of the collector current Ic, the both-end voltage of the primary coil 32 drastically increases by the self-induction electromotive force to generate the induced electromotive force up to about several dozens of kV in the both-end voltage of the secondary coil 34.

In this way, the ignition apparatus 2000 according to the present embodiment can cause the ignition plug 20 to discharge to ignite the combustible gas by supplying the voltage of the secondary coil 34 to the ignition plug 20, as described in FIG. 2. As the igniting operation of the ignition apparatus 2000 is executed, the collector current Ic returns to the approximate 0 A and the collector potential Vc returns to the output potential of the power source. Note that, as the igniting operation, the collector potential Vc instantaneously becomes the high potential and then returns to the output potential of the power source.

As described above, the semiconductor apparatus 200 according to the present embodiment limits the collector current Ic of the power semiconductor element 110 to the current value equal to or less than the threshold to prevent the overcurrent from flowing. Also, the semiconductor apparatus 200 can prevent the erroneous discharge of the ignition plug due to the drastic fluctuation of the collector current Ic.

By combining the semiconductor apparatus 100 and the semiconductor apparatus 200 according to the present embodiment described above, a driving circuit of the power semiconductor element 110 with overcurrent protection and self-cutting off functions is expected. Here, a semiconductor apparatus combining the self-cutting off circuit shown in FIG. 1 and the overcurrent protection circuit shown in FIG. 3 will be described in the followings.

Figure 5:
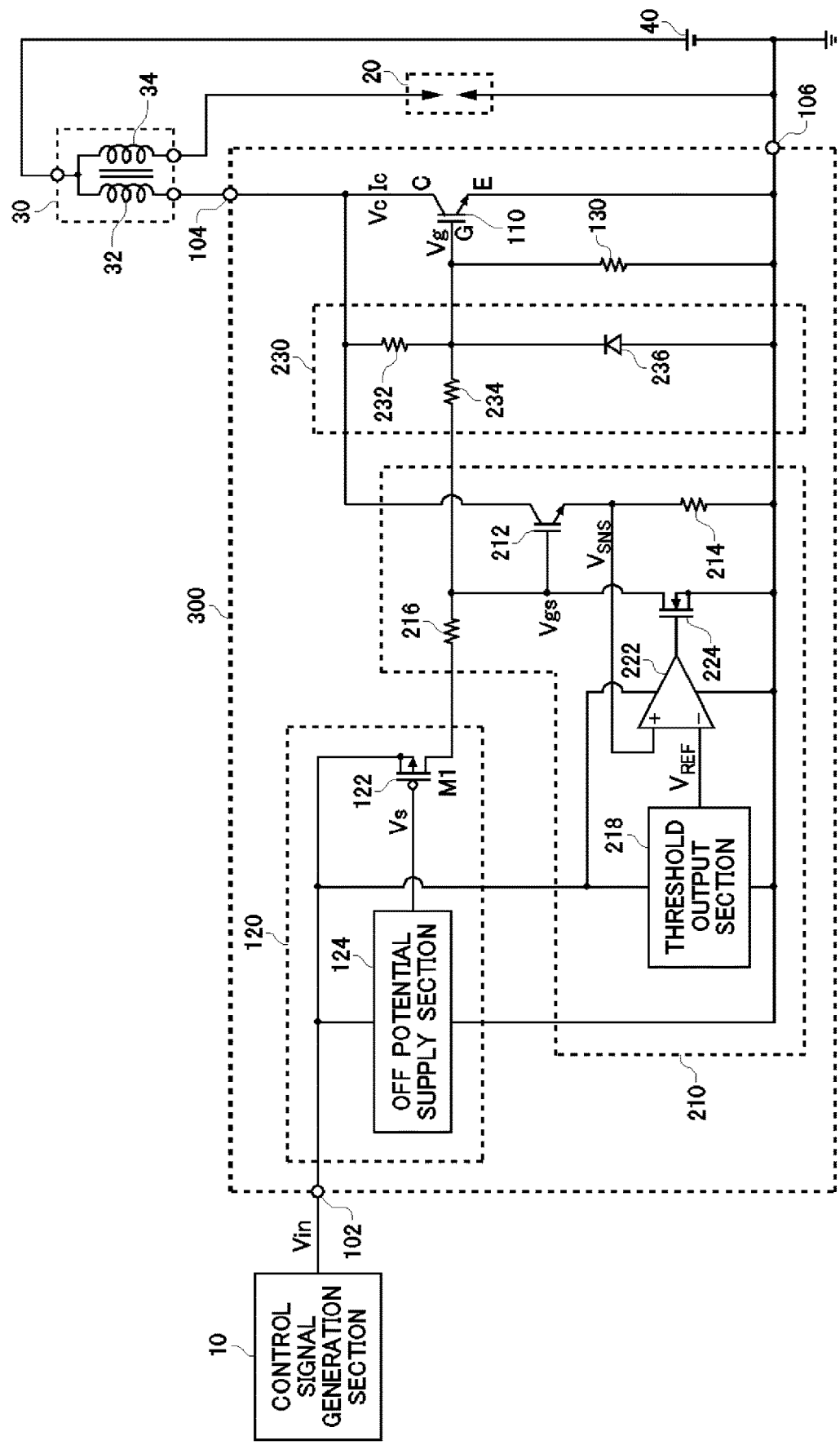
FIG. 5 shows an exemplary configuration of an ignition apparatus 3000 according to the present embodiment.

FIG. 5 shows an exemplary configuration of an ignition apparatus 3000 according to the present embodiment. In the ignition apparatus 3000 shown in FIG. 5, the operations approximately the same as those of the ignition apparatus 1000 and the ignition apparatus 2000 according to the present embodiment shown in FIG. 1 and FIG. 3 are respectively provided with the same reference signs as those of the ignition apparatus 1000 and the ignition apparatus 2000, and the descriptions are omitted. The ignition apparatus 3000 comprises a semiconductor apparatus 300. The descriptions for the control signal generation section 10, the ignition plug 20, the ignition coil 30, and the power source 40 comprised in the ignition apparatus 3000 are omitted.

The semiconductor apparatus 300 limits the collector current Ic flowing through the power semiconductor element 110 to become to be equal to or less than the approximately constant current, to prevent the erroneous discharge of the ignition plug 20. The semiconductor apparatus 200 comprises the control terminal 102, the first terminal 104, the second terminal 106, the power semiconductor element 110, the first gate control section 120, the discharge circuit 130, the second gate control section 210, and the feedback section 230.

As shown in FIG. 1, the control signal input from the control terminal 102 is supplied to the first gate control section 120. Also, as shown in FIG. 3, the control signal output from the first gate control section 120 is supplied to the gate of the power semiconductor element 110 via the second gate control section 210 and the feedback section 230. The descriptions for each section comprised in the semiconductor apparatus 300 are omitted since each section performs approximately the same operations as each section shown in FIG. 1 and FIG. 3. Operations of such a semiconductor apparatus 300 will be described in the followings.

Figure 6:
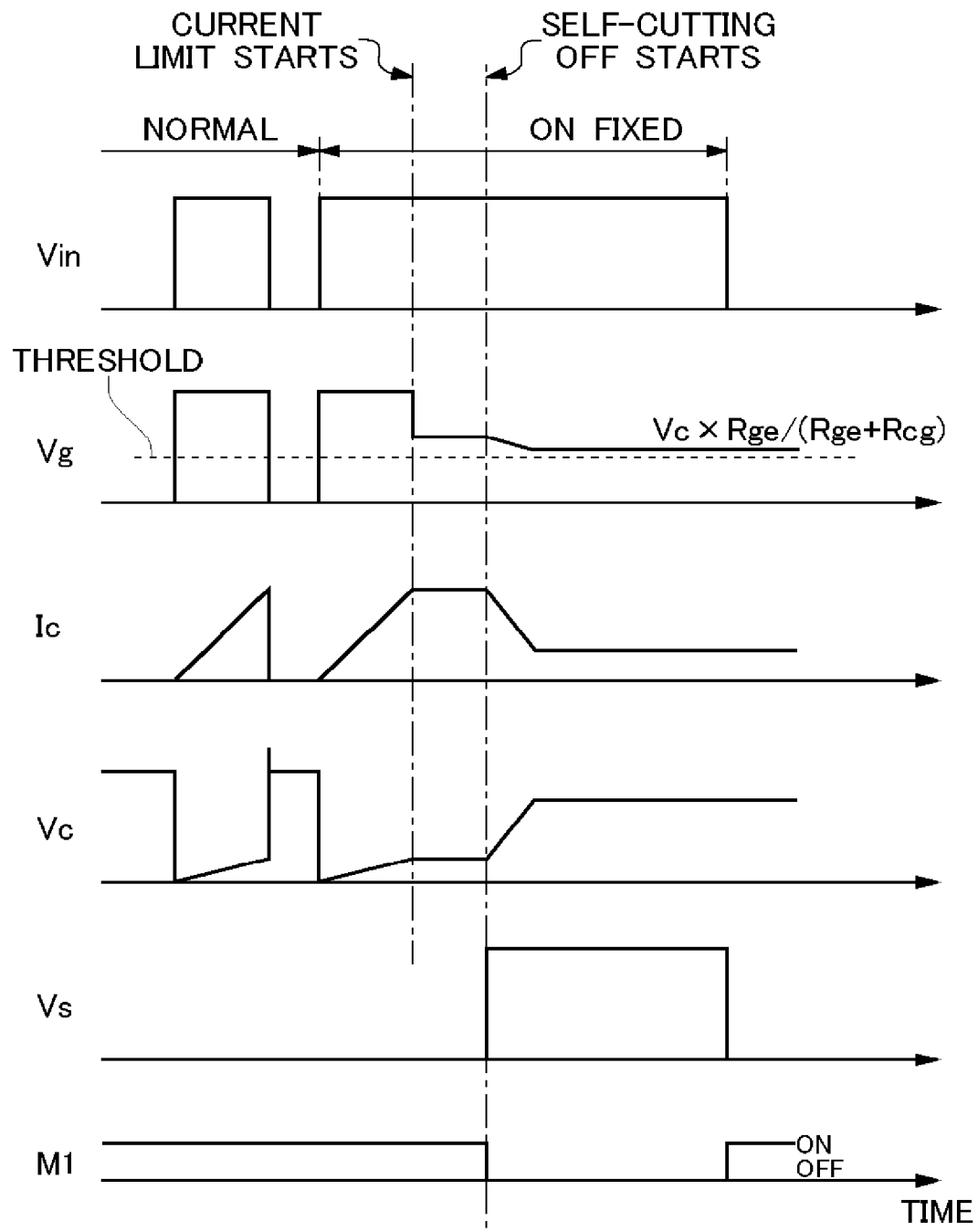
FIG. 6 shows one example of operation waveforms of each section of a semiconductor apparatus 300 according to the present embodiment.

FIG. 6 shows one example of operation waveforms of each section of the semiconductor apparatus 300 according to the present embodiment. In FIG. 6, the horizontal axis indicates time and the vertical axis indicates potentials or current values. Also, in FIG. 6, Vin indicates the control signal input from the control terminal 102, Vg indicates the gate potential of the power semiconductor element 110, Ic indicates the collector current of the power semiconductor element 110, Vc indicates the collector potential of the power semiconductor element 110, Vs indicates the output potential (cut-off signal) of the OFF potential supply section 124, and M1 indicates the ON and OFF states of the first switch element 122.

In the normal state where no abnormality of the power semiconductor element 110 is detected, the collector current Ic increases or decreases in a range equal to or less than the threshold when the control signal Vin is the low potential, when the control signal Vin then becomes the high potential from the low potential, and when the control signal Vin becomes the low potential again. That is, the second gate control section 210 and the feedback section 230 do not perform operations to change the gate potential of the power semiconductor element 110. Therefore, the operation waveforms of each section of the semiconductor apparatus 300 are approximately the same as the operation waveforms of the semiconductor apparatus 100 in the range shown as "normal" in FIG. 2. Here, the description for the operations of the semiconductor apparatus 300 in the range shown as "normal" in the control signal Vin of FIG. 6 is omitted.

Next, an example where the failure and the like of the control signal generation section 10 occurs and the control signal Vin remains the high potential without switching to the low potential is described. If the control signal Vin becomes the high potential, the gate potential Vg becomes the high potential, the collector current Ic starts to increase, and the collector potential Vc becomes the approximate 0V and then starts to increase.

Here, as the control signal Vin is kept at the high potential, the gate potential Vg also maintains the high potential and the increase of the collector current Ic continues. The second gate control section 210 limits the increase of the collector current Ic if such a collector current Ic continues increasing and exceeds the threshold. That is, the second gate control section 210 starts the current limit of the collector current Ic in response to the detection potential $V_{SNS}$ of the detection section 214 exceeding the reference potential $V_{REF}$. In FIG. 6, "current limit starts" is shown as an example of the starting time of the current limit.

The description for the operation of limiting the current of the collector current Ic is omitted here since it is approximately the same as the operation described in FIG. 4. Since the collector current Ic can be limited to a current value smaller than the saturated current by the operation of the current limit of the second gate control section 210 and the feedback section 230, the semiconductor apparatus 300 can execute safer and more stable operations even when the failure and the like occur.

As the abnormal state where the control signal Vin remains the high potential is detected, the OFF potential supply section 124 starts the self-cut off of the semiconductor apparatus 300. In FIG. 6, the starting time of the self-cut off is shown as "self-cutting off starts" as one example.

The OFF potential supply section 124 supplies the cut-off signal Vs being the OFF potential to the gate of the first switch element 122 to set the first switch element 122 (M1) to be in the OFF state. Accordingly, by the discharge circuit 130, the charges accumulated in the gate of the power semiconductor element 110 has a time constant based on a resistance value of the discharge circuit 130 and gradually moves to the reference potential. That is, the gate potential Vg of the power semiconductor element 110 gradually decreases compared to the switching to the low potential in the normal operation.

However, while the erroneous discharge of the ignition plug 20 is prevented by discharging the minute current by the discharge circuit 130 from the gate of the power semiconductor element 110 to the reference potential, the feedback section 230 refluxes the minute current to the gate of the power semiconductor element 110 to limit the collector current Ic. Therefore, as shown in FIG. 5, as the first gate control section 120, the discharge circuit 130, the second gate control section 210, and the feedback section 230 are simply combined, the gate potential of the power semiconductor element 110 becomes determined under a condition where the reflux according to the feedback section 230 and the discharge current according to the discharge circuit 130 are balanced.

The gate potential Vg in this case can be shown as Vc·Rge/(Rge+Rce), for example. Note that Rge indicates the resistance value of the discharge circuit 130, and Rce indicates the resistance value of the first resistance 232. That is, the gate potential Vg of the power semiconductor element 110 becomes to gradually decrease from the ON potential and then is kept at the approximately constant potential. The constant potential is determined according to constants of elements and the like, and may become larger than the threshold of the power semiconductor element 110 sometimes. In this case, the power semiconductor element 110 becomes to be kept in the ON state, as shown in FIG. 6.

That is, the semiconductor apparatus 300 cannot cut off the power semiconductor element 110 even if the first gate control section 120 executes the self-cut off operation. In this way, although the semiconductor apparatus 100 shown in FIG. 1 and the semiconductor apparatus 200 shown in FIG. 3 respectively comprise the functions to protect the ignition apparatus and semiconductor apparatus and to prevent the erroneous discharge of the ignition plug 20, malfunctions may occur sometimes if combining them. Here, the semiconductor apparatus 400 according to the present embodiment prevents such a malfunction and executes safer and more stable operations.

Figure 7:
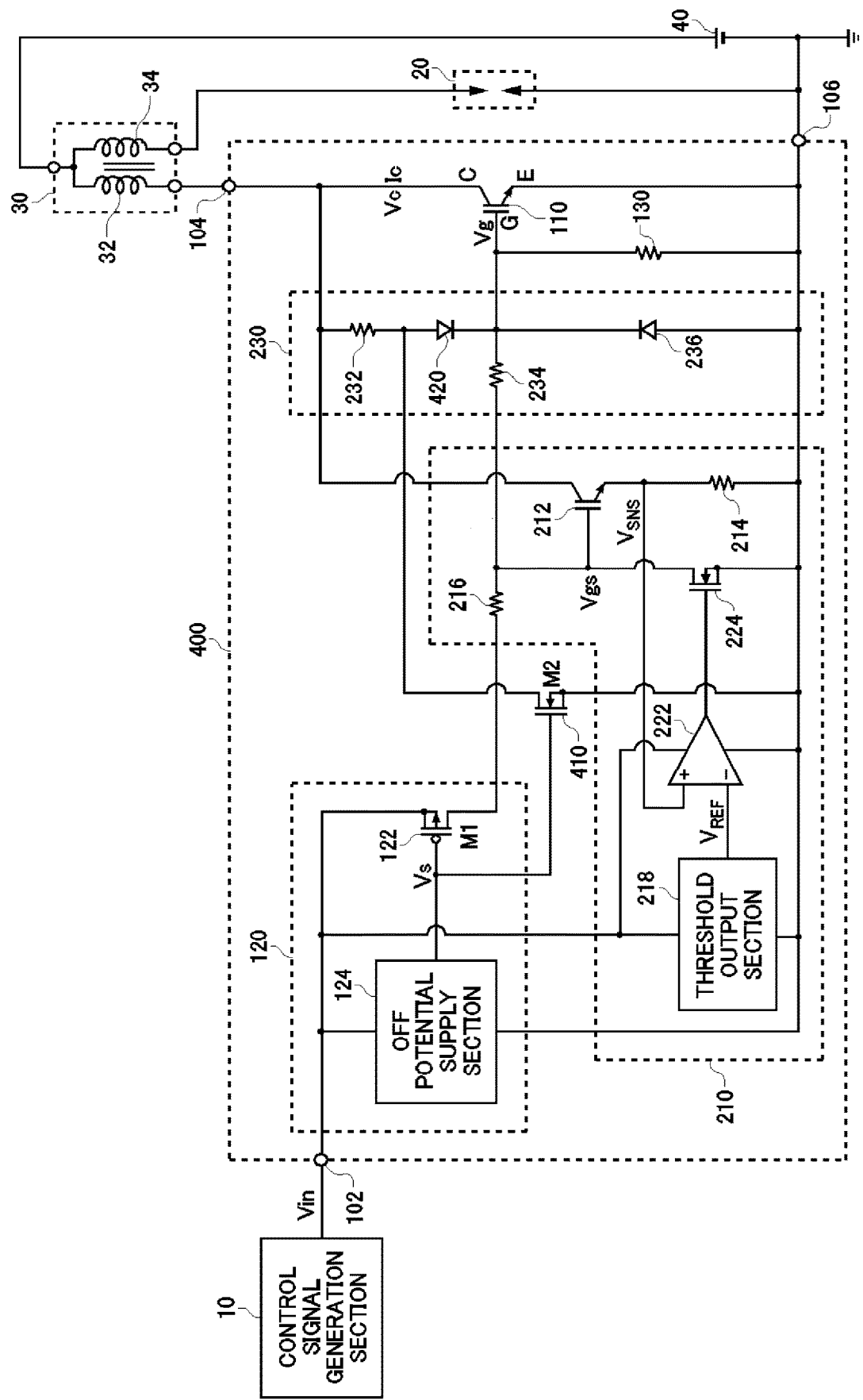
FIG. 7 shows an exemplary configuration of an ignition apparatus 4000 according to the present embodiment.

FIG. 7 shows an exemplary configuration of the ignition apparatus 4000 according to the present embodiment. In the ignition apparatus 4000 shown in FIG. 7, the operations approximately the same as those of the ignition apparatus 1000, the ignition apparatus 2000, and the ignition apparatus 3000 according to the present embodiment shown in FIG. 1, FIG. 3, and FIG. 5 are respectively provided with the same reference signs as those of the ignition apparatus 1000, the ignition apparatus 2000, and the ignition apparatus 3000, and the descriptions are omitted. The ignition apparatus 4000 comprises a semiconductor apparatus 400. The descriptions for the control signal generation section 10, the ignition plug 20, the ignition coil 30, and the power source 40 comprised in the ignition apparatus 4000 are omitted.

The semiconductor apparatus 400 limits the collector current Ic flowing through the power semiconductor element 110 so as to be equal to or less than the approximately constant current to prevent the erroneous discharge of the ignition plug 20. The semiconductor apparatus 200 comprises the control terminal 102, the first terminal 104, the second terminal 106, the power semiconductor element 110, the first gate control section 120, the discharge circuit 130, the second gate control section 210, the feedback section 230, and the current cutting off section 410.

The control signals input from the control terminal 102 are supplied to the first gate control section 120, as shown in FIG. 1. Also, the control signals output from the first gate control section 120 are supplied to the gate of the power semiconductor element 110 via the second gate control section 210 and the feedback section 230, as shown in FIG. 3. The descriptions for the first gate control section 120, the discharge circuit 130, and the second gate control section 210 are omitted since they perform approximately the same operations as each section shown in FIG. 1 and FIG. 3.

The feedback section 230 provided in the semiconductor apparatus 400 further has a first rectifying element 420. The first rectifying element 420 suppresses electrical signals which flow reversely from the gate of the power semiconductor element 110 to the first terminal 104 side. The first rectifying element 420 is provided between the gate of the power semiconductor element 110 and the first resistance 232. That is, the first resistance 232 is connected between the first terminal and the first rectifying element. Note that in the present embodiment, a rectifying element 236 included in the feedback section 230 is taken as a second rectifying element. That is, the second rectifying element (the rectifying element 236) is connected between the gate of the power semiconductor element 110 and the second terminal 106.

The current cutting off section 410 cuts off the currents flowing through the gate of the power semiconductor element 110 from the first terminal 104 according to the control signals input from the control terminal 102. The current cutting off section 410 cuts off the currents flowing through the gate of the power semiconductor element 110 in response to the control signal satisfying the predetermined cut-off condition. That is, the current cutting off section 410 cuts off the current flowing through the gate of the power semiconductor element 110 in response to the OFF potential supply section 124 determining that the cut-off condition of the power semiconductor element 110 is satisfied.

The current cutting off section 410 is connected between both the first resistance 232 and the first rectifying element 420 and the second terminal 106, and in response to the control signal satisfying the cut-off condition, the current cutting off section 410 electrically connects between both between the first resistance 232 and the first rectifying element 420 and the second terminal 106. As one example, the current cutting off section 410 is connected to the OFF potential supply section 124, and has a normally-off switch element to switch to the ON state in response to the cut-off signal from the OFF potential supply section 124 being supplied to the gate of the normally-off switch element. The current cutting off section 410 is an n channel type MOSFET, for example.

The semiconductor apparatus 400 surely sets, by comprising the current cutting off section 410, the power semiconductor element 110 to the OFF state when the abnormality of the power semiconductor element 110 is detected. Operations of such a semiconductor apparatus 400 is described in the followings.

Figure 8:
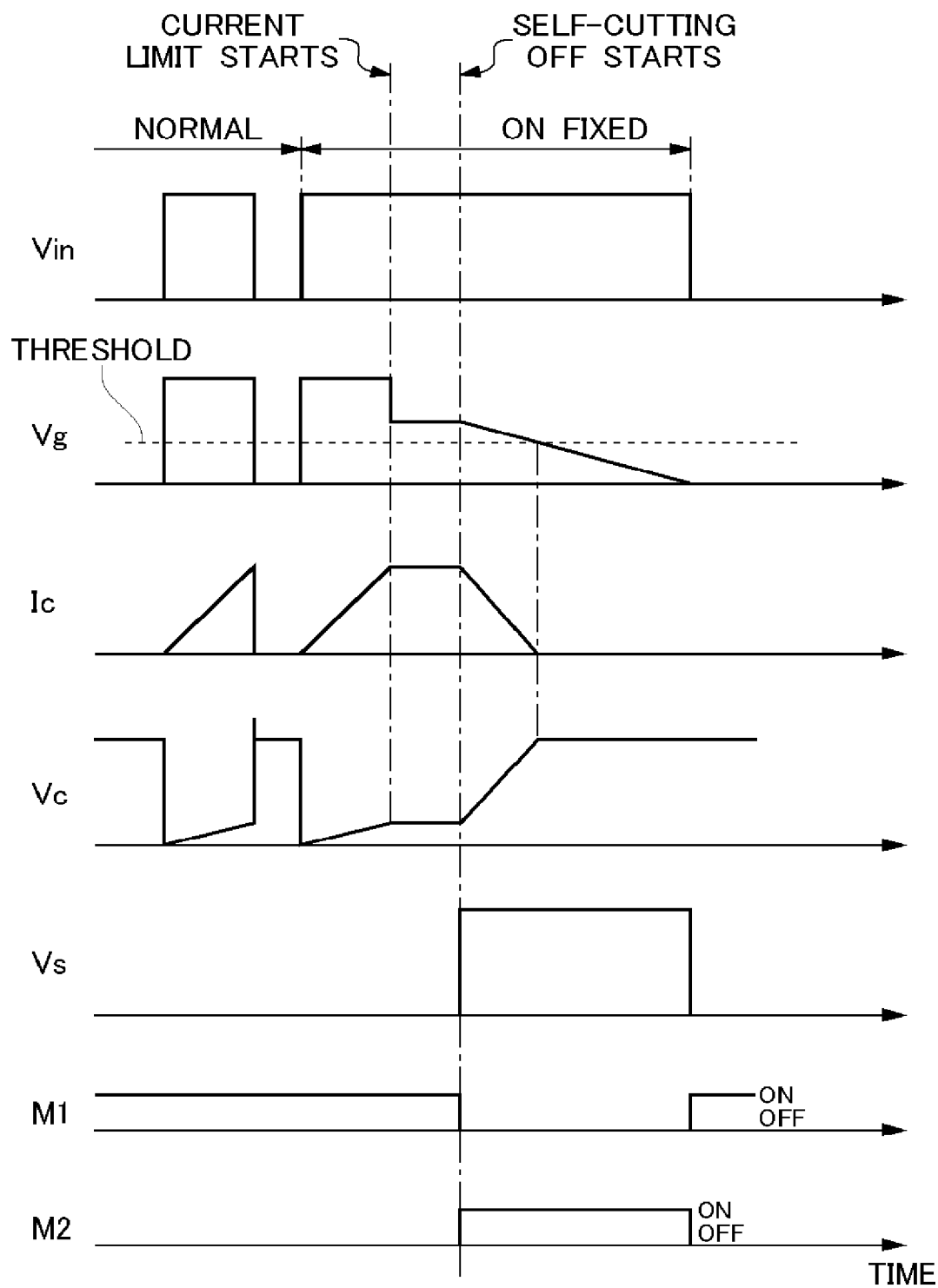
FIG. 8 shows one example of operation waveforms of each section of a semiconductor apparatus 400 according to the present embodiment.

FIG. 8 shows one example of operation waveforms of each section of the semiconductor apparatus 400 according to the present embodiment. In FIG. 8, the horizontal axis indicates time, and the vertical axis indicates potentials or current values. Also, in FIG. 8, Vin indicates the control signal input from the control terminal 102, Vg indicates the gate potential of the power semiconductor element 110, Ic indicates the collector current of the power semiconductor element 110, Vc indicates the collector potential of the power semiconductor element 110, Vs indicates the output potential (cut-off signal) of the OFF potential supply section 124, M1 indicates the ON and OFF states of the first switch element 122, and M2 indicates the ON and OFF states of the current cutting off section 410.

In the normal state where no abnormality is detected in the power semiconductor element 110, when the control signal Vin is the low potential, when the control signal Vin becomes the high potential from the low potential, and when the control signal Vin then then becomes the low potential again, the operation waveforms of each section of the semiconductor apparatus 400 are approximately the same as the operation waveforms of the semiconductor apparatus 100 and the semiconductor apparatus 300 in the ranges shown as "normal" in FIG. 2 and FIG. 6. Here, the description for the operations of the semiconductor apparatus 400 in the range shown as "normal" in the control signal Vin of FIG. 8 is omitted.

Next, an example where the failure and the like of the control signal generation section 10 occur and the control signal Vin remains the high potential without switching to the low potential is described. In this case, as described in FIG. 6, as the control signal Vin is kept at the high potential, the gate potential Vg also maintain the high potential and the increase of the collector current Ic continues. Then, the second gate control section 210 starts the current limit of the collector current Ic in response to the detection potential $V_{SNS}$ of the detection section 214 exceeding the reference potential $V_{REF}$. In FIG. 8, similar to the example of FIG. 6, the starting time of the current limit is shown as "current limit starts".

Since the collector current Ic can be limited to a current value smaller than the saturated current by limiting the current of the collector current Ic, the semiconductor apparatus 400 can execute safer and more stable operations even when the failure and the like occur. Then, the OFF potential supply section 124 starts the self-cut off of the semiconductor apparatus 400 as the abnormal state where the control signal Vin remains the high potential is detected. In FIG. 8, similar to the example of FIG. 6, the starting time of the self-cut off is shown as "self-cutting off starts".

The OFF potential supply section 124 supplies the cut-off signal Vs being the OFF potential to the gate of the first switch element 122 to set the first switch element 122 (M1) to be in the OFF state. Accordingly, by the discharge circuit 130, the charges accumulated in the gate of the power semiconductor element 110 has a time constant based on the resistance value of the discharge circuit 130 and gradually moves to the reference potential. That is, the gate potential Vg of the power semiconductor element 110 gradually decreases compared to the switching to the low potential in the normal operation.

Then, the current cutting off section 410 (M2) switches to the ON state according to the cut-off signal Vs of the OFF potential supply section 124. Accordingly, the current cutting off section 410 cuts off the minute current that the feedback section 230 refluxes from the first terminal 104 to the gate of the power semiconductor element 110. That is, the current cutting off section 410 electrically connects from the first terminal 104 to the second terminal 106 via the first resistance 232 to continue the decrease of the gate potential Vg of the power semiconductor element 110.

Then, in response to the gate potential Vg of the power semiconductor element 110 becoming smaller than the threshold of the power semiconductor element 110, the power semiconductor element 110 becomes to be in the OFF state and the collector current Ic returns to 0 A. The collector potential Vc is gradually raised to a degree to which the igniting operation does not start, and returns to the potential of the initial state in response to the gate potential Vg becoming equal to or less than the threshold. The collector current Ic and the collector potential Vc return to the original states, and then the gate potential Vg returns to the low potential.

It should be noted that as the state of the control signal generation section 10 returns to the original one and the control signal becomes the low potential, the cut-off signal Vs of the OFF potential supply section 124 also becomes the low potential to switch the first switch element 122 to the ON state and to switch the current cutting off section 410 to the OFF state. The above is the operations of the semiconductor apparatus 400 in the range shown as "ON fixed" in the control signal Vin of FIG. 8.

As described above, when the abnormality of the power semiconductor element 110 is detected, the semiconductor apparatus 400 according to the present embodiment temporally gradually lowers the gate potential of the power semiconductor element 110 to a degree to which the discharge of the ignition plug due to the drastic fluctuation of the collector current Ic can be prevented. Accordingly, the semiconductor apparatus 400 can surely relax/cut off the power semiconductor element 110 while preventing the erroneous discharge of the ignition plug 20 according to the abnormality of the power semiconductor element 110. That is, the semiconductor apparatus 400 can operate as an igniter which controls currents flowing through the ignition coil 30 according to the control signals from outside and accurately execute the overcurrent protection and self-cut off functions.

Figure 9:
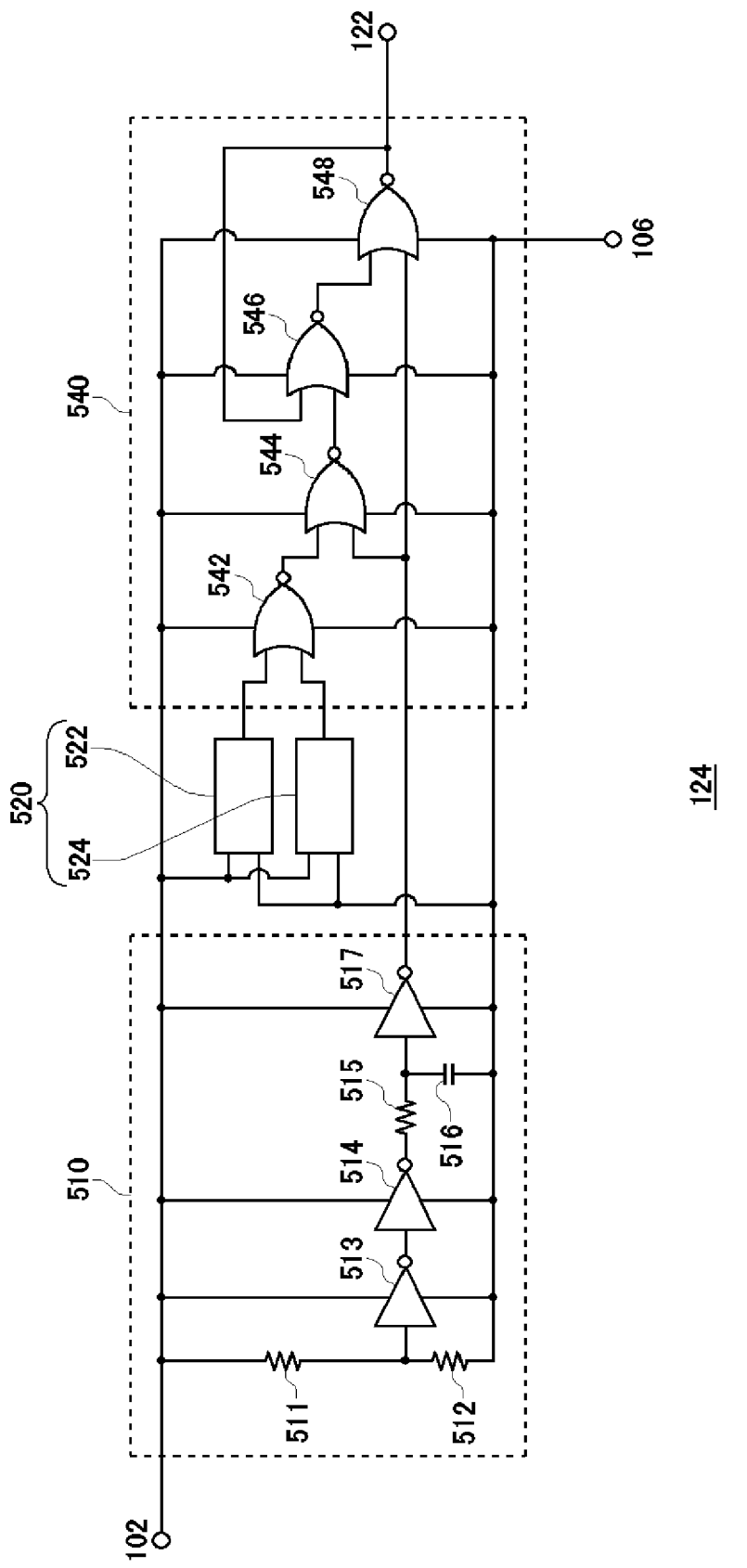
FIG. 9 shows an exemplary configuration of an OFF potential supply section 124 according to the present embodiment.

FIG. 9 shows an exemplary configuration of the OFF potential supply section 124 according to the present embodiment. The OFF potential supply section 124 has the reset section 510, the cut-off condition detection section 520, and the latch section 540.

The reset section 510 outputs a reset signal after the reference period of time elapses since the ON potential is input to the control terminal 102. The reset section 510 includes a resistance 511, a resistance 512, an inverter 513, an inverter 514, a resistance 515, a capacitor 516, and an inverter 517.

The resistance 511 and the resistance 512 are connected in series between the control terminal 102 and the second terminal 106 to divide the voltage of the control signal Vin input from the control terminal 102. The voltage-divided potential is expressed as Vin·R2/(R1+R2), where R1 indicates the resistance value of the resistance 511 and R2 indicates the resistance value of the resistance 512. As one example, if the control signal transiently rises linearly from the OFF potential (0V) to the ON potential (5V), the voltage-divided potential also rises linearly from 0V to 5·R2/(R1+R2).

The inverter 513 is connected between the resistance 511 and the resistance 512, receives the voltage-divided potential, and inverts the voltage-divided potential and outputs the inverted voltage-divided potential. The inverter 514 receives the output of the inverter 513, and inverts the output and outputs the inverted output. The resistance 515 and the capacitor 516 configure the RC circuit to receive the output of the inverter 514, have a delay of the time constant RC, and output the rising signal. The inverter 517 receives the output of the resistance 515 and the capacitor 516, and inverts the output and outputs the inverted output.

Note that the inverter 513, the inverter 514, and the inverter 517 respectively take the control signal input from the control terminal 102 as the operation power source. Therefore, if the control signal transiently rises, the inverter 513, the inverter 514 and the inverter 517 respectively output signals having approximately the same potential signal as that of the control signal until the control signal reaches the threshold of the inverters. Note that in the present example, the thresholds of each inverter are set as approximately the same value Vthi. Operations of the reset section 510 described above will be described later.

The cut-off condition detection section 520 detects whether or not the predetermined cut-off condition is satisfied. The cut-off condition detection section 520 detects whether or not an abnormality, such as temperature rise and the like, of the power semiconductor element 110 and/or of the peripheral circuit and the like of the power semiconductor element 110 occurs. For example, the cut-off condition detection section 520 detects whether or not the conduction state of the power semiconductor element 110 has been remained over a period equal to or greater than the reference period of time. Instead of this, or in addition of this, the cut-off condition detection section 520 may measure the temperature of the power semiconductor element 110 to detect whether or not the temperature rose to a temperature equal to or greater than the reference temperature.

For example, the cut-off condition detection section 520 includes a plurality of the detection circuits and the like. FIG. 9 shows an example where the cut-off condition detection section 520 includes a timer circuit 522 and a temperature detection circuit 524. The timer circuit 522 measures the elapsed time since the power semiconductor element 110 becomes the ON state. The timer circuit 522 may determine that the cut-off condition is satisfied and output the high potential in response to the measured time being beyond the reference period of time. The temperature detection circuit 524 detects the temperature of the power semiconductor element 110 and/or the ambient temperature of the power semiconductor element 110. The temperature detection circuit 524 may determine that the cut-off condition is satisfied and output the high potential in response to e the detection temperature exceeding the reference temperature.

The latch section 540 latches that the cut-off condition is detected. The latch section 540 includes a first NOR circuit 542, a second NOR circuit 544, a third NOR circuit 546, and a fourth NOR circuit 548. The first NOR circuit 542, the second NOR circuit 544, the third NOR circuit 546, and the fourth NOR circuit 548 respectively take the control signal input from the control terminal 102 as the operation power source. Therefore, under the condition where the control signal has become the high potential, the latch section 540 outputs the cut-off signal in accordance with the detection of the cut-off condition. Operations of the latch section 540 when the control signal becomes the high potential are described in the followings.

The first NOR circuit 542 receives respective outputs of the timer circuit 522 and of the temperature detection circuit 524 and outputs an NOR operation result. The first NOR circuit 542 outputs the low potential when at least one of the timer circuit 522 and the temperature detection circuit 524 is the high potential. That is, the first NOR circuit 542 outputs the high potential if no abnormality is detected in the power semiconductor element 110, and outputs the low potential in response to the abnormality being detected.

The second NOR circuit 544 respectively receives the output of the first NOR circuit 542 and the reset signal of the reset section 510 to output the NOR operation result. That is, the second NOR circuit 544 outputs the high potential if the abnormality is detected in the power semiconductor element 110 and the reset signal is not input.

The third NOR circuit 546 receives the outputs of the second NOR circuit 544 and the latch section 540, and outputs the NOR operation result. Also, the fourth NOR circuit 548 receives the output pf the third NOR circuit 546 and the reset signal, and outputs the NOR operation result. The third NOR circuit 546 and the fourth NOR circuit 548 configure a RS flip flop. That is, after the reset signal is input to the fourth NOR circuit 548, the third NOR circuit 546 and the fourth NOR circuit 548 latch, as a set signal, the high potential which is input to the third NOR circuit 546 and is in accordance with the detection of the abnormality of the power semiconductor element 110. Note that the latch section 540 receives the power supply from the control terminal 102 to maintain the latched value.

Figure 10:
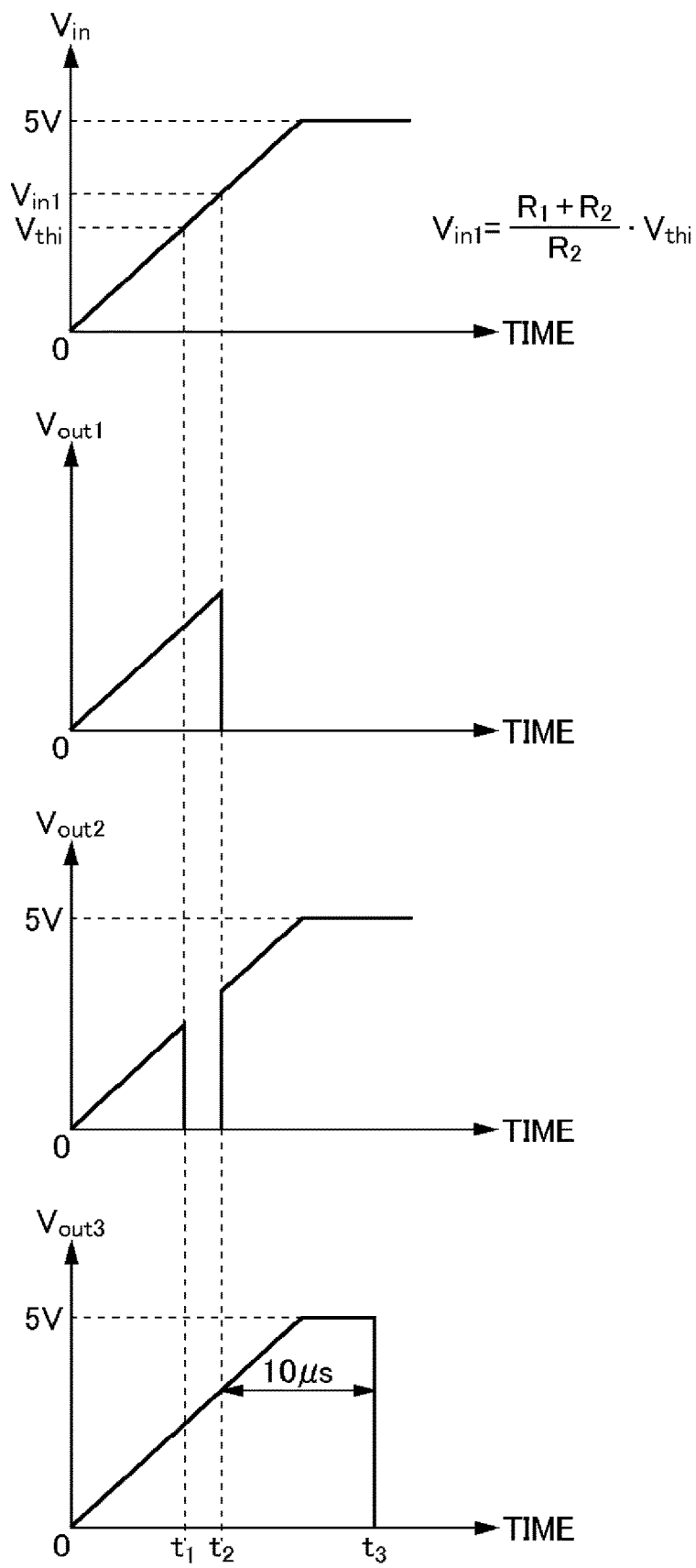
FIG. 10 shows one example of operation waveforms of each section of a reset section 510 according to the present embodiment.

FIG. 10 shows one example of operation waveforms of each section of the reset section 510 according to the present embodiment. In FIG. 10, the horizontal axis indicates time and the vertical axis indicates output potentials. FIG. 10 shows one example of the output potentials of the inverter 513, the inverter 514, and the inverter 517 relative to a case where the control signal Vin input to the control terminal 102 rises linearly from the OFF potential (0V) to the ON potential (5V). The output potentials of the inverter 513, the inverter 514, and the inverter 517 become approximately the same potential as the control signal Vin until the input potential reaches the thresholds of the respective inverters.

Since the input voltage-divided potential Vin·R2/(R1+R2) is equal to or less than the threshold Vthi even if the potential of the power source exceeds the threshold Vthi, the inverter 513 takes the input potential as the low potential, and inverts the high potential and outputs the inverted potential. Note that even if the inverter 513 operates so as to output he high potential, in a case of the transient potential of a process until the power source potential reaches the high potential (for example, 5V), the inverter 513 outputs the power source potential as the high potential. FIG. 10 shows an example where an output potential Vout1 of the inverter 513 also outputs the power source potential Vin on and after a time t1.

The inverter 513 inverts the low potential and outputs the inverted potential in response to the potential of the power source exceeding the threshold Vthi and the input voltage-divided potential exceeding the threshold Vthi (i.e., the input of the high potential). FIG. 10 shows an example where the output potential Vout1 of the inverter 513 becomes the low potential (0V) at a time t2.

The inverter 514 inverts the low potential and outputs the inverted potential in response to the potential of the power source being the potential that exceeds the threshold Vthi and the input potential being the potential that exceeds the threshold Vthi. FIG. 10 shows an example where an output potential Vout2 of the inverter 514 becomes the low potential at the time t1. The inverter 514 inverts the high potential and outputs the inverted potential in response to the potential of the power source being the potential that exceeds the threshold Vthi and the input potential being the low potential. Note that in a case of the transient potential of the process until the power source potential reaches the high potential, the inverter 514 outputs the power source potential as the high potential. FIG. 10 shows an example where the output potential Vout2 of the inverter 514 outputs the power source potential Vin on and after the time t2.

The RC circuit according to the resistance 515 and the capacitor 516 delays the output signal of the inverter 514. FIG. 10 shows an example where the RC circuit delays the output signal by 10 μs. The inverter 517 inverts the low potential and outputs the inverted potential in response to the potential of the power source being the potential that exceeds the threshold Vthi and the input potential being the potential that exceeds the threshold Vthi. FIG. 10 shows an example where an output potential Vout3 of the inverter 517 becomes the low potential at time t3.

As described above, the reset section 510 according to the present embodiment outputs the reset signal after the reference period of time t2 elapses since the ON potential is input to the control terminal 102. The reset signal shown in FIG. 10 is, as one example, a pulse signal with a time constant set by the resistance 515 and the capacitor 516 as a pulse width.

As described above, in the OFF potential supply section 124 according to the present embodiment, under the condition where the control signal has become the high potential, the latch section 540 latches that the cut-off condition is satisfied according to the detection of the abnormality of the power semiconductor element 110. The OFF potential supply section 124 supplies the cut-off signal to the first switch element 122. The first switch element 122 switches to the OFF state according to the cut-off signal. In this way, the first gate control section 120 having the first switch element 122 and the OFF potential supply section 124 functions to set the gate potential of the power semiconductor element 110 as the OFF potential in response to the cut-off condition being detected.

While the embodiments of the present invention have been described, the technical scope of the invention is not limited to the above described embodiments. It is apparent to persons skilled in the art that various alterations and improvements can be added to the above-described embodiments. It is also apparent from the scope of the claims that the embodiments added with such alterations or improvements can be included in the technical scope of the invention.

The operations, procedures, steps, and stages of each process performed by an apparatus, system, program, and method shown in the claims, embodiments, or diagrams can be performed in any order as long as the order is not indicated by "prior to," "before," or the like and as long as the output from a previous process is not used in a later process. Even if the process flow is described using phrases such as "first" or "next" in the claims, embodiments, or diagrams, it does not necessarily mean that the process must be performed in this order.

What is claimed is:

1. A semiconductor apparatus, comprising:
   a power semiconductor element which is connected between a first terminal on a high-potential side and a second terminal on a low-potential side and is controlled to be turned on or off according to a gate potential;
   a first gate control section which controls a gate potential of the power semiconductor element according to a control signal that is input from a control terminal and controls the power semiconductor element;
   a discharge circuit which is connected between a gate of the power semiconductor element and a reference potential and discharges charges that are charged by the gate of the power semiconductor element;
   a second gate control section which controls the gate potential of the power semiconductor element according to a collector current of the power semiconductor element;
   a feedback section which feeds back the charges to the gate of the power semiconductor element according to the collector potential of the power semiconductor element; and
   a current cutting off section which cuts off currents flowing from the first terminal to the gate of the power semiconductor element according to the control signal.

2. The semiconductor apparatus according to claim 1, wherein
   the feedback section has a first rectifying element which suppresses an electrical signal that flows reversely from the gate of the power semiconductor element to the first terminal.

3. The semiconductor apparatus according to claim 2, wherein
   the feedback section has:
   a first resistance which is connected between the first terminal and the first rectifying element,
   a second rectifying element which is connected between the gate of the power semiconductor element and the second terminal, and
   a second resistance which is connected between the gate of the power semiconductor element and the second gate control section.

4. The semiconductor apparatus according to claim 3, wherein
   the current cutting off section is connected between both the first resistance and the first rectifying element and the second terminal.

5. The semiconductor apparatus according to claim 1, wherein
   the first gate control section has:
   a first switch element which is connected between the control terminal and the gate of the power semiconductor element and is controlled to be turned on or off according to an input potential, and an OFF potential supply section which supplies to the first switch element an OFF potential that turns the first switch element off in response to the control signal satisfying a predetermined cut-off condition.

6. The semiconductor apparatus according to claim 5, wherein the current cutting off section cuts off currents flowing through the gate of the power semiconductor element in response to the control signal satisfying the predetermined cut-off condition.

7. The semiconductor apparatus according to claim 5, wherein the OFF potential supply section determines that the cut-off condition is satisfied in response to an abnormality of the power semiconductor element being detected.

8. The semiconductor apparatus according to claim 1, wherein the second gate control section has:

a second switch element which is connected between the first terminal and the second terminal and is controlled to be turned on or off according to an input potential, a detection section which is connected between the second switch element and the second terminal and detects an amount of currents flowing from the first terminal to the second terminal, a comparing section which compares a detection result of the detection section to a predetermined threshold, and a third switch element which is connected between a gate of the second switch element and the second terminal and controls a gate potential of the second switch element according to a comparison result of the comparing section.

9. The semiconductor apparatus according to claim 8, wherein the second switch element is a power semiconductor element having a same threshold and a small transconductance, compared to the power semiconductor element.

10. The semiconductor apparatus according to claim 1, wherein the first gate control section and the second gate control section use an electrical signal input from the control terminal as a power source.

11. The semiconductor apparatus according to claim 1, wherein the power semiconductor element is an IGBT (Insulated Gate Bipolar Transistor) or a vertical MOSFET.

12. The semiconductor apparatus according to claim 1, wherein the semiconductor apparatus is an igniter which controls currents flowing through an ignition coil according to the control signal from outside.

* * * * *